United States Patent [19]
Wallace

[11] 3,834,330
[45] Sept. 10, 1974

[54] COMBINED PLOW AND FERTILIZER DISPENSER

[76] Inventor: Roy H. Wallace, Chalmers, Ind.

[22] Filed: Oct. 15, 1970

[21] Appl. No.: 80,955

Related U.S. Application Data

[63] Continuation-in-part of Ser. No. 702,296, Feb. 1, 1968, abandoned.

[52] U.S. Cl. .................................. 111/7, 285/238
[51] Int. Cl. ........................................... A01c 23/02
[58] Field of Search .......... 111/7, 6, 52; 248/75, 63, 248/56; 285/238, 421; 280/472, 412

[56] References Cited
UNITED STATES PATENTS

| | | | |
|---|---|---|---|
| 1,921,581 | 8/1933 | Paul | 200/412 |
| 2,358,946 | 9/1944 | Tornblom | 248/63 |
| 2,458,670 | 1/1949 | Young, Jr. | 248/56 |
| 2,768,591 | 10/1956 | James | 111/7 |
| 2,843,066 | 7/1958 | Dugan | 111/7 |
| 2,874,981 | 2/1959 | Brady | 285/238 |
| 3,185,117 | 5/1965 | Frantzen | 111/7 |
| 3,218,999 | 11/1965 | Pattison | 111/7 |
| 3,296,985 | 1/1967 | Shelton | 111/7 |
| 3,372,657 | 3/1968 | Hansen | 111/52 X |
| 3,384,038 | 5/1968 | Fenet | 111/6 |

*Primary Examiner*—Stephen C. Pellegrino
*Attorney, Agent, or Firm*—Woodard, Weikart, Emhardt & Naughton

[57] ABSTRACT

A combined plow and anhydrous ammonia fertilizer dispenser wherein the ammonia tank is connected to the plow so as to be drawn over unplowed ground. Hose means lead from the tank to the individual plow blades and dispense fertilizer beneath the soil being turned over in the furrows. The hoses are held in position by novel wear-reducing clamps. A further embodiment combines a chisel plow and fertilizer dispenser. The plow blades have hoses mounted thereon by clamps. Some of the plow blades which are located rearwardly of other plow blades push the dirt into the furrows cut by the forwardly located plow blades and also cover the exhaust end of the hoses with dirt causing the fertilizer to be retained in the soil.

7 Claims, 16 Drawing Figures

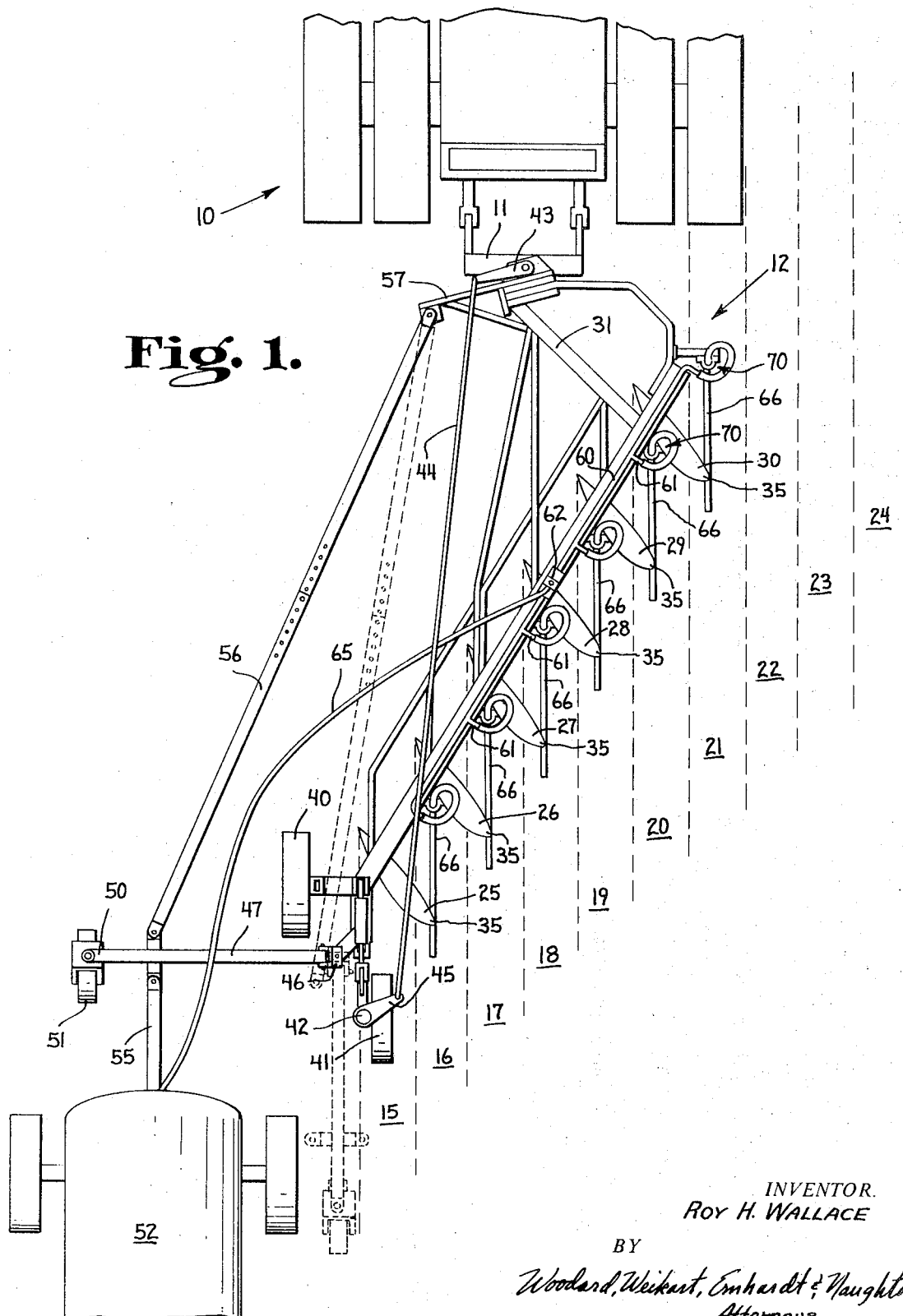

INVENTOR.
ROY H. WALLACE

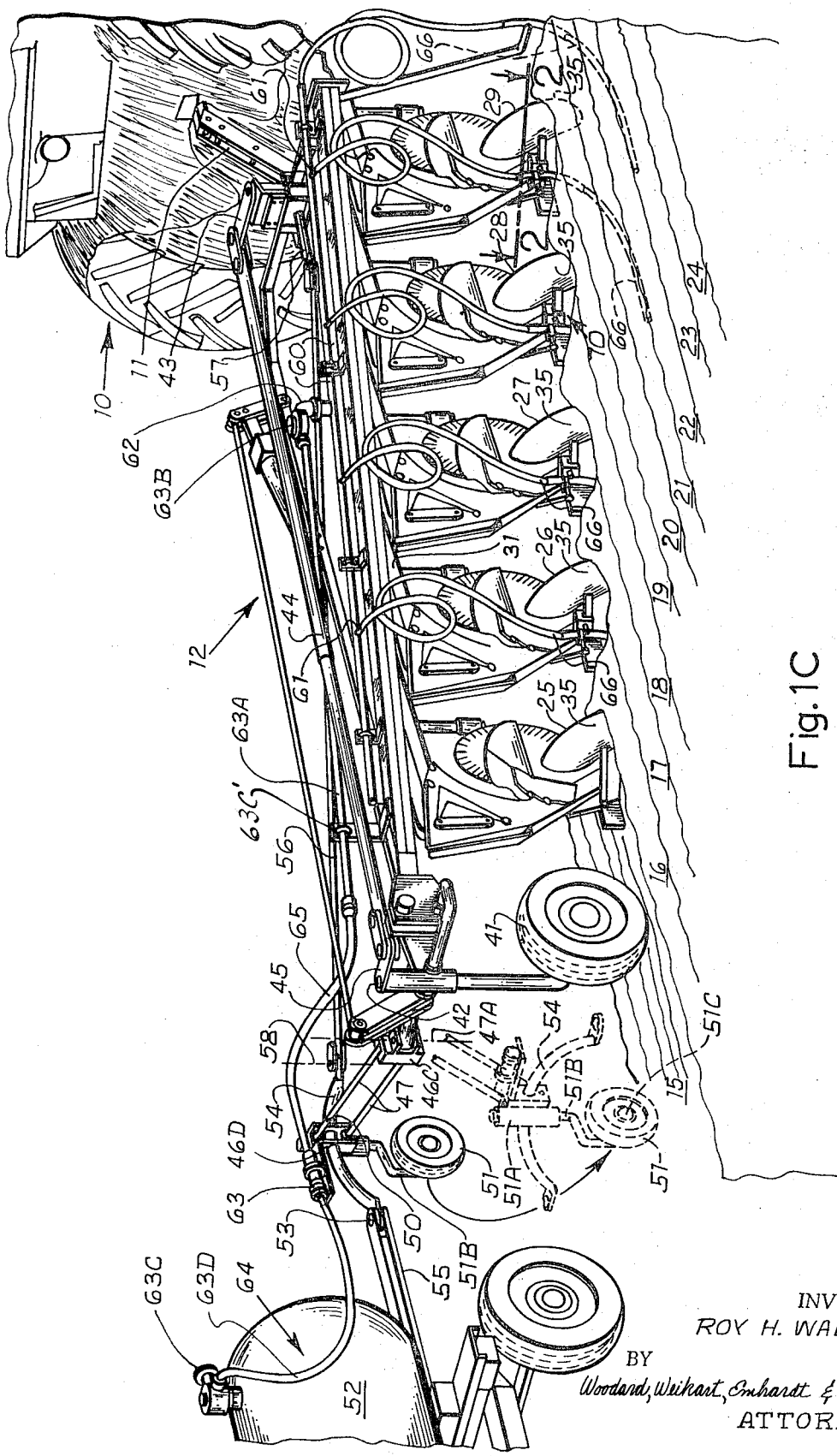

INVENTOR
ROY H. WALLACE

BY
Woodard, Weikart, Emhardt & Naughton
Attorneys

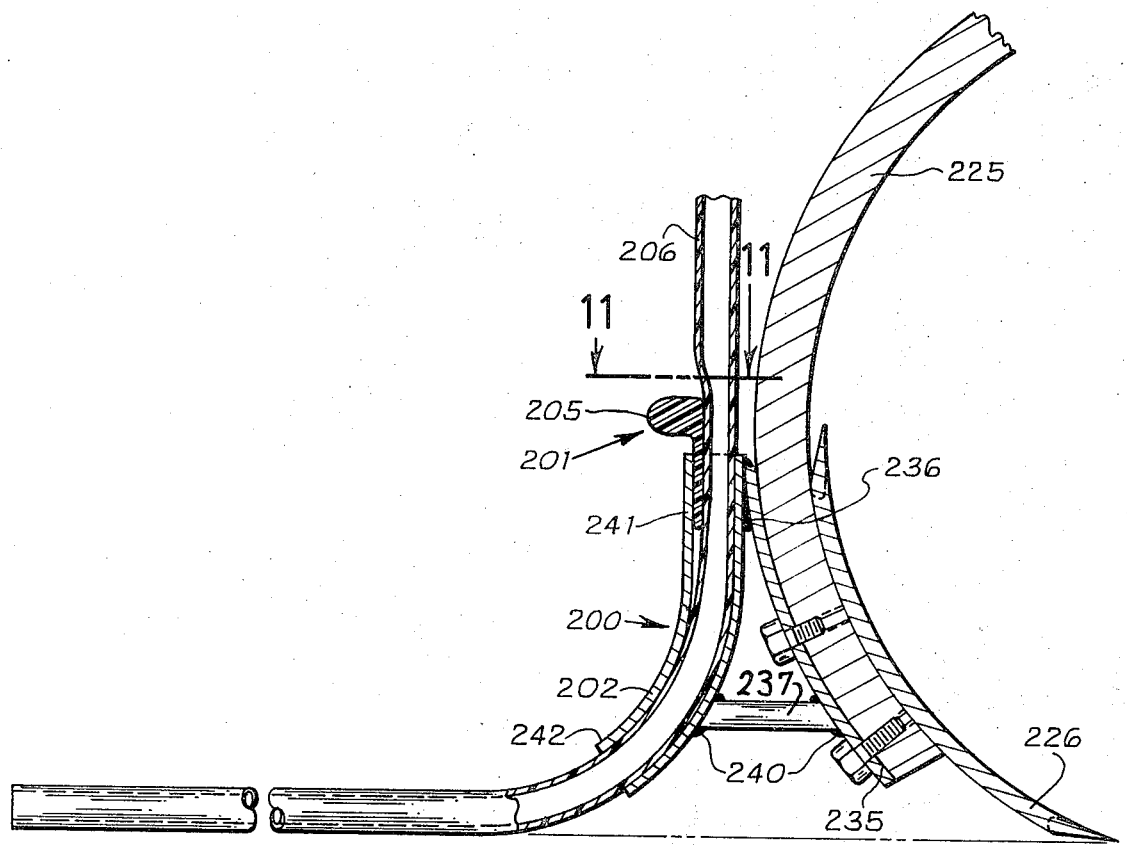
Fig. 9
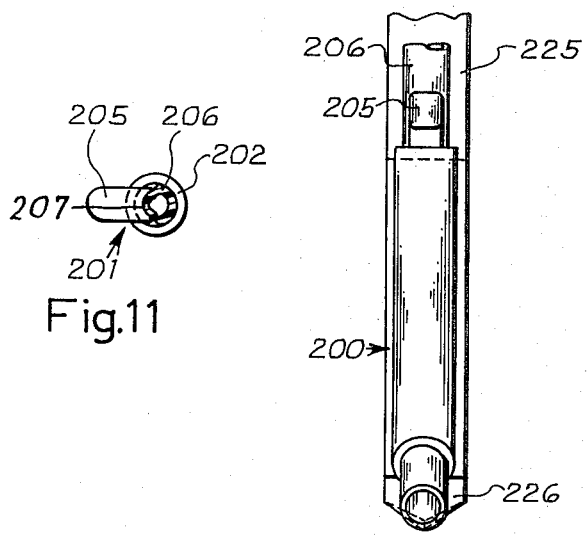
Fig. 11
Fig. 10
INVENTOR.
ROY H. WALLACE
BY
Woodard, Weikart, Emhardt & Naughton
ATTORNEYS

COMBINED PLOW AND FERTILIZER DISPENSER

CROSS-REFERENCE TO RELATED APPLICATIONS

This is a continuation-in-part of application Ser. No. 702,296, filed Feb. 1, 1968, now abandoned.

BACKGROUND OF THE INVENTION

1. Field of the Invention. This invention relates to a combined plow and fluid dispenser and to a subcombination thereof.

2. Description of the Prior Art. Various devices have been conceived for placing anhydrous ammonia in the soil. For example, the U.S. patent to Garretson, U.S. Pat. No. 2,973,728, discloses an arrangement wherein knives are used with conduits following behind the knives for placing the ammonia in the soil. Apparatus such as that disclosed in Garretson requires that the farmer operate his tractor throughout a complete tour of his land thus requiring substantial time and effort. Consequently, it is desirable that efficient means be provided for reducing the time and effort required to get the ammonia into the soil. Other prior art disclosures are:

| Number | Name |
|---|---|
| 805,579 | Patchen |
| 1,750,514 | Gates |
| 1,872,792 | Neorr |
| 1,881,539 | Harris |
| 1,921,581 | Paul |
| 2,272,190 | Elliott |
| 2,285,932 | Leavitt |
| 2,288,569 | Mason et al. |
| 2,357,956 | Johnson |
| 2,358,946 | Tornblom |
| 2,464,958 | Allen |
| 2,547,867 | Judson |
| 2,637,258 | Silver et al. |
| 2,649,061 | Hawkins et al. |
| 2,757,827 | Russell |
| 2,789,522 | Barton |
| 2,861,527 | Phillips |
| 2,894,765 | Maxwell |
| 2,915,094 | Daniels |
| 3,218,999 | Pattison |
| 3,295,482 | Dountas et al. |

SUMMARY OF THE INVENTION

One embodiment of this invention might include plowing and fertilizing apparatus comprising a frame, a plurality of plow blades mounted on said frame and spaced at intervals from one another and arranged to open a plurality of parallel furrows, a plurality of hoses, means mounting each of said hoses on said plow frame in such a position that they each are positioned rearwardly of a respective one of said plow blades, and hang freely in a rearwardly extending configuration, some of said plow blades being positioned rearwardly of said plow as compared to others of said plow blades, said some blades acting to move dirt into the furrows opened by said other blades, said hoses extending rearwardly of sufficient distance that their distal ends are as rearward as said some blades whereby said some blades are moving dirt into said furrows over the distal ends of said hoses, and means for providing fertilizer to said hoses for exhausting from the distal ends thereof.

One object of this invention is to provide improved apparatus for placing anhydrous ammonia fertilizer into the soil.

Still another object of this invention is to provide a combined plow and fluid fertilizer dispenser which can be easily adjusted for wear.

A further object of the invention is to provide a combined plow and fluid fertilizer dispenser which is highly effective in getting fluid fertilizer deeper and more widely dispersed in the soil.

Still a further object of the invention is to provide an improved clamp.

Related objects will become apparent as the description proceeds.

BRIEF DESCRIPTION OF THE DRAWINGS

FIG. 1C is a perspective view of the structure illustrated in FIGS. 1A and 1B showing in solid lines the position of FIG. 1A and showing fragmentarily in dotted lines the position of FIG. 1B.

FIG. 9 is an enlarged fragmentary vertical section taken along the line 9—9 of FIG. 7 in the direction of the arrows.

FIG. 10 is a fragmentary rear elevation of the structure illustrated in FIG. 9.

FIG. 11 is a horizontal section taken along the line 11—11 of FIG. 9 in the direction of the arrows.

DESCRIPTION OF THE PREFERRED EMBODIMENT

Figure 1A:
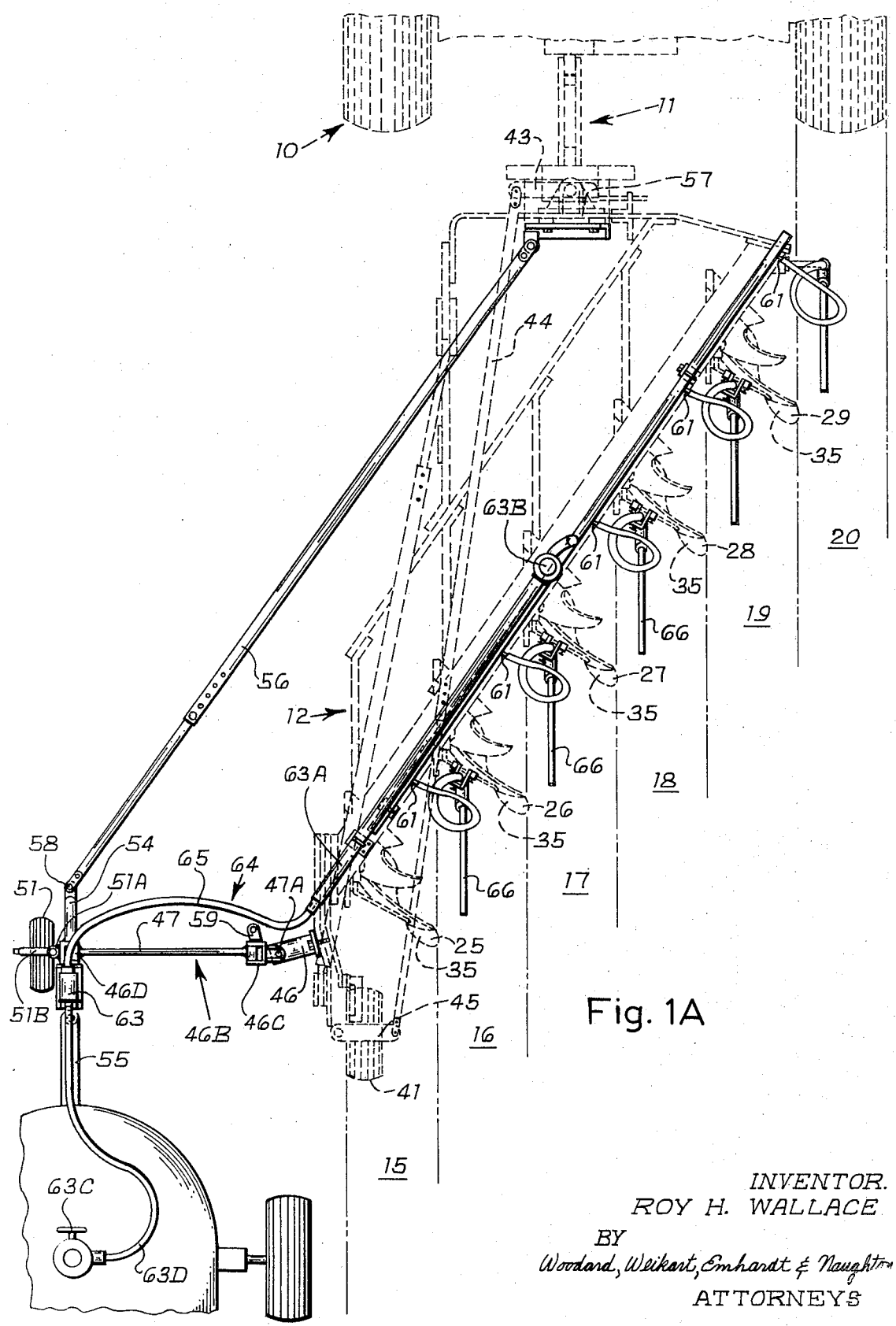
FIG. 1A is a top plan view of a combined plow and fertilizer dispenser embodying the present invention and showing the apparatus in plowing and fertilizing position with dotted lines indicating the conventional plow and tractor.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a tractor 10 having a conventional draw bar 11 which is capable of being raised and lowered by suitable hydraulic means on the tractor for placing the plow 12 in condition for plowing or in condition for road travel. As shown in FIG. 1A and 1C the plow 12, which is generally conventional (and might be for example an Oliver Semi-Mounted Plow No. 565, manufactured by the Oliver Corporation of Chicago, Illinois), is in position for plowing of furrows 15 through 19 inclusive. Furrows 20–24 inclusive have already been plowed by previous passage of the plow 12. Furrow 20 is a dead furrow from the previous passage of the plow while furrow 15 is the dead furrow from the illustrated passage of the plow. Of course, the term "dead furrow" is used to indicate that no dirt is thrown into the furrow by any of the plowshares (mold boards) 25–29, inclusive, until the subsequent passage of the plow whereupon the plowshare 29 does throw dirt into furrow 20.

Each of the plowshares 25–29 is mounted upon a frame 31 of the plow. In conventional fashion each of the plowshares 25–29 has a mold board portion 35 which functions to lift the dirt and throw it over into the furrow adjacent to the furrow from which the dirt is dug by the respective plowshare. A wheel 41 is mounted on the frame 31 of the plow and forms a conventional part of the plow. The wheel 41 functions to support the plow when it is being pulled on the road and also to support the plow when it is in the process of plowing. The wheel 41 also functions as a furrow guide and is mounted upon a vertical post 42 secured to the frame 31 of the plow and is vertically adjustable on the frame 31. The wheel 41, of course, runs in the dead furrow for example 15 to guide the plow. The wheel 41 may be steered by means of a lever 45 which is coupled to a lever 43 by means of a link 44. As mentioned the above features of the plow are conventional and consequently, will not be further described.

Fixed to the rearward portion 46A of the frame 31 is a mounting member 46. An elongated element 46B (including a pair of end members 46C and 46D and a pair of rods 47) is pivoted to the mounting member 46. The end member 46C being connected to the member 46 by a suitable means provides this pivotal connection which is about the axis 47A. Each of the rods 47 is pivoted at its opposite ends to the respective members 46C and 46D with the four such pivotal connections being about horizontal axes. It will be noted that each of the members 46C and 46D has in part a channel shaped configuration and that each of the four pivotal connections is made with the rods 47 projecting into the channel shaped configurations. The elongated element 46B when in the position of FIGS. 1A and 1C extends laterally in a direction outboard and sidewardly away from the plow frame.

Figure 1B:
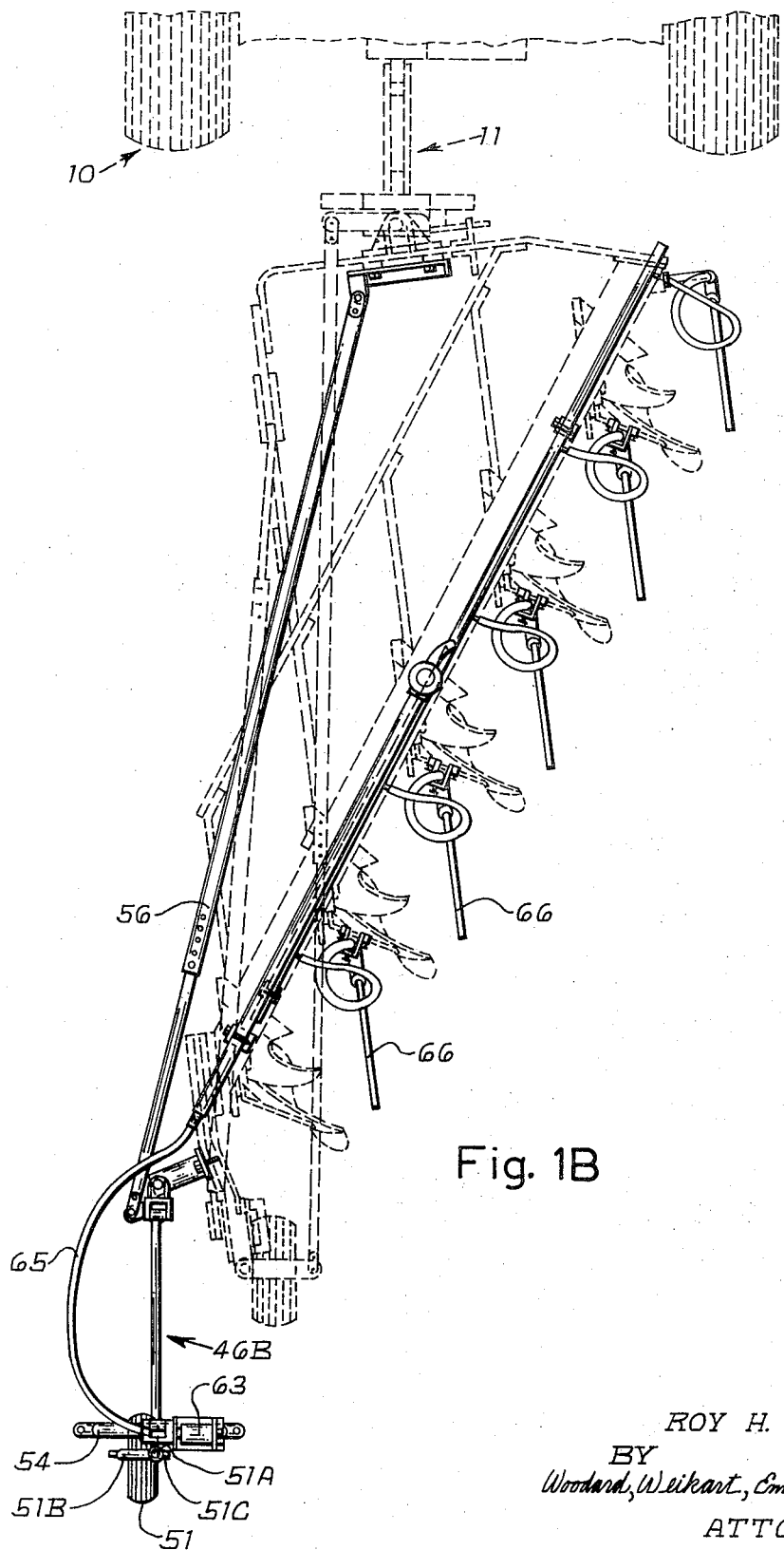
FIG. 1B is a view similar to FIG. 1A but showing the apparatus in transporting position.

A link member 54 is fixed to the member 46D which also has fixed thereto a bearing 51A. The bearing 51A pivotally receives a rod 51B which provides a mounting for the axle 51C of a supporting wheel 51. As shown in FIGS. 1A and 1B the supporting wheel 51 travels in two positions relative to the member 46D. In each of these positions (See FIGS. 1A and 1B) the rod 51B is pinned to the bearing 51A in such a manner that the wheel 51 extends in a front to rear position. The link member 54 when in the position of FIGS. 1A and 1C has one end pivoted to the pull rod 56 about axis 58 and its other end pivoted to the draw bar 55 of tank vehicle 52 about the axis 53. The parallelogram arrangement provided by the rods 47 and members 46C and 46D permits the wheels 41 and 51 to move vertically relative to one another and to remain oriented in a vertical direction. Of course the function of the link member 54 is to pull the tank vehicle 52 and the function of the wheel 51 is to support the link member 54 so that it can perform its function. The pull rod 56 which is adjustable as to length provides the force to pull the member 54 and is pivotally connected at its forward end to the forward portion 57 of the plow frame 31.

The channel member 46C is provided with additional projections 59 which in the manner shown in FIG. 1B can be used to pivotally connect the member 46C to the pull rod 56 in such a manner that the elongated element 46B projects rearwardly instead of sidewardly as shown in FIG. 1A. When the apparatus is in the position of FIG. 1B, the link member 54 is disconnected from the draw bar 55 and from the pull rod 56. Also the wheel 51 is pinned in the front-to-rear extending position of FIG. 1B, the above described pin engaging the rod 51B and the bearing 51A.

Mounted on the plow frame 31 is a manifold 60 which has a plurality of output conduits 61 and an input conduit 62. A conduit means 64 leads from the tank vehicle 52 to the input conduit 62 of the manifold. Conduit means 64 includes a hose 65 which leads from a conventional coupling device 63 to an input pipe 63A. The pipe is fixed to the frame 31 by bracket 63C′. Mounted between the pipe 63A and the input conduit 62 of the manifold is a nitrator 63B which regulates the pressure p.s.i. of the ammonia gas going into the manifold 60.

Figure 5:
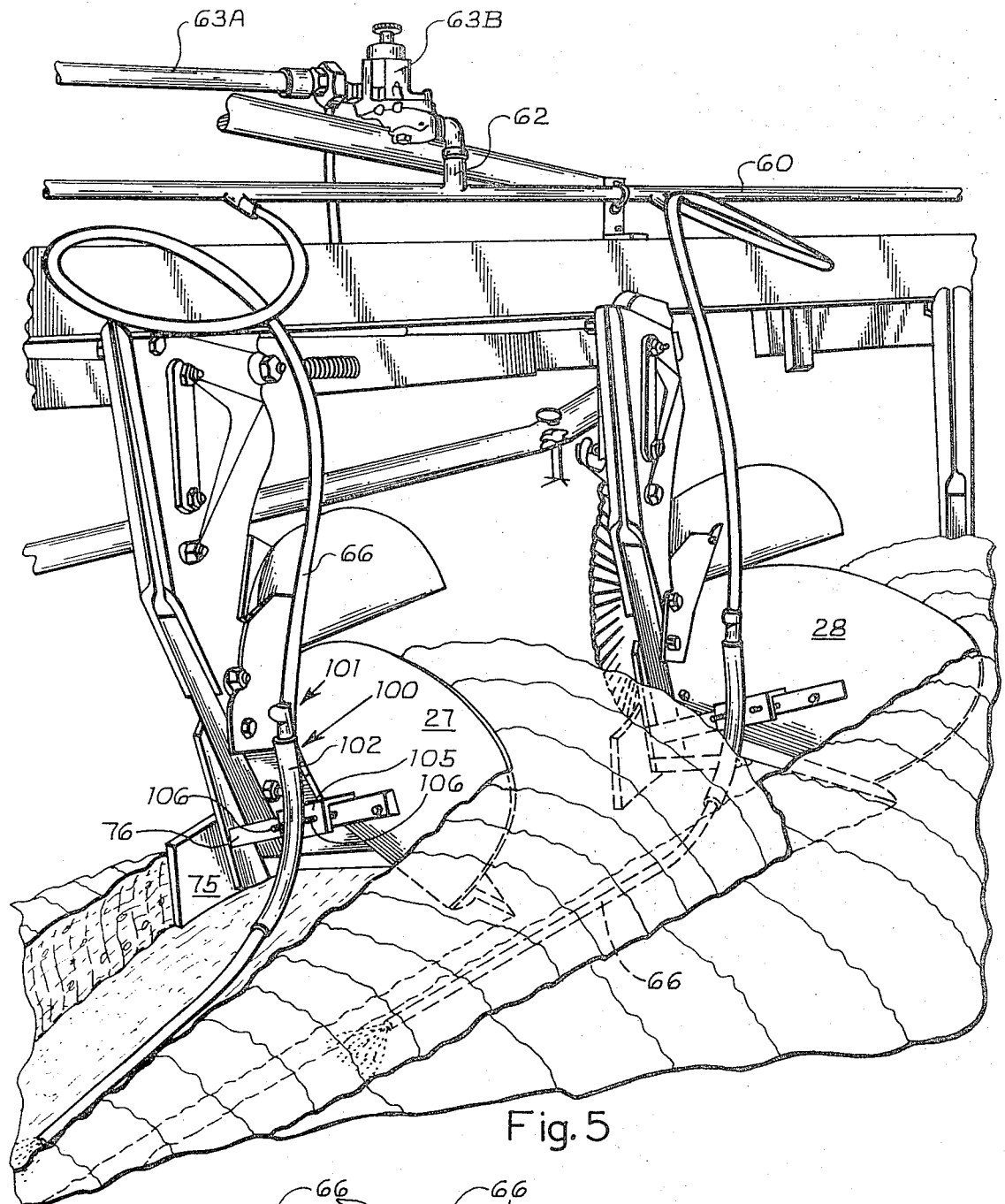
FIG. 5 is a fragmentary perspective view of the apparatus taken from generally the same direction as FIG. 1C but showing the apparatus enlarged and showing a modified form of mounting the fertilizer dispensing hose.
Figure 6:
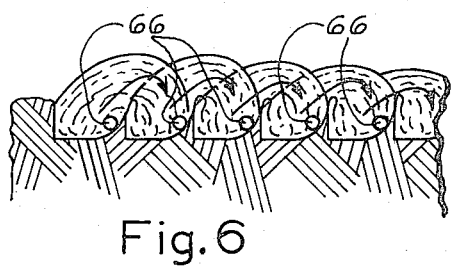
FIG. 6 is a vertical section of the earth showing schematically the manner of operation of the plow and fertilizer dispenser.

The coupling device is, for example, a "Pioneer" manufactured by Parker Hannefin Quick Coupling Division of Minneapolis, Minn. The nitrator is, for example, a Model No. APR 6000 manufactured by Continental NH$_3$ Products Co., Inc. of Dallas, Texas 75222. The tank 52 has an output on-off valve 63C. A hose 63D leads from that valve to the coupling device 63. A plurality of hoses 66 are each mounted on the frame 31 by means of a clamping device 70 and are each coupled to a respective one of the output conduits 61. It will be noted that each of the hoses 66 is hung so as to drag along in the respective furrow beneath the dirt thrown over into the furrow by the mold board portion 35 of each plowshare. When the present apparatus is in operation, each of the hoses 66 is discharging anhydrous ammonia and the anhydrous ammonia is thoroughly and deeply mixed into the soil by having the soil thrown over the various hoses 66 as the anhydrous ammonia exits from the various hoses. This operation is illustrated in FIGS. 5 and 6.

Figure 2:
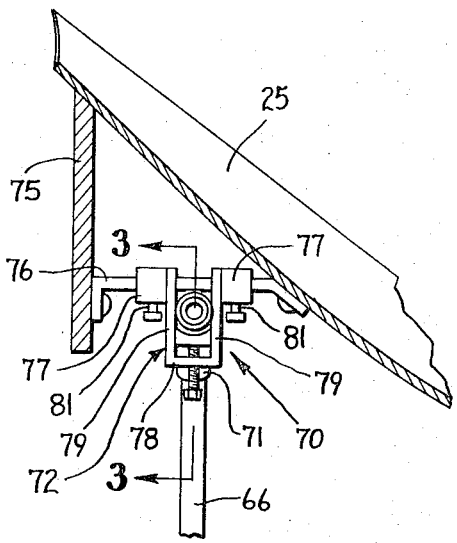
FIG. 2 is an enlarged somewhat simplified top plan view partially in section of a portion of one of the plowshares illustrated in FIG. 1 and also showing the means for mounting a fertilizer dispensing hose as embodied in the present invention.
Figure 3:
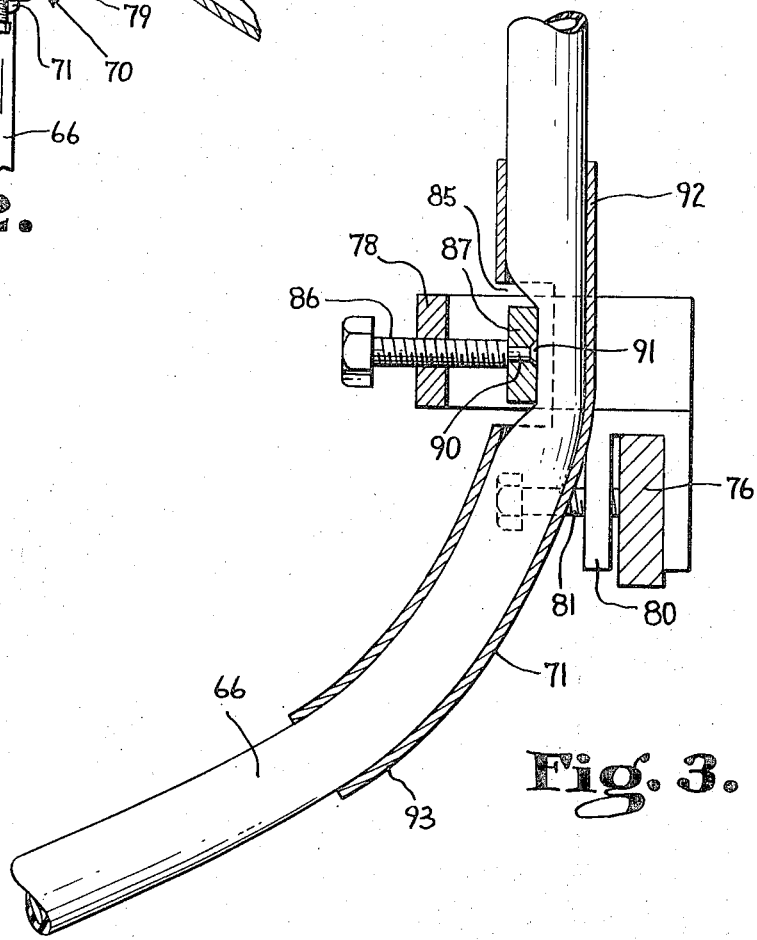
FIG. 3 is an enlarged vertical section taken along the line 3—3 of FIG. 2 in the direction of the arrows.

Referring now more particularly to FIGS. 2 and 3, the details of a representative one of the clamping devices 70 are illustrated. A projecting element or landslide 75 (which may be formed of more than one member as illustrated in the Figures other than FIG. 2) is fixed to the rear of the plowshare and serves as a mounting place for a clamp mounting bar (mold board brace) 76 which extends horizontally between the element 75 and the plowshare and is fixed at its opposite ends to the element 75 and the plowshare. Thus the clamping device 70 is horizontally adjustable on the bar 76 in order to position the hose 66 at the best location so that the anhydrous ammonia exiting from the hose 66 is properly diffused through the soil in the furrow. The clamping device 70 includes a tube 71 a yoke 72, and a pair of channels 77.

The tube 71 is straddled by the yoke 72 which has a base 78 and a pair of arms 79, the arms 79 being welded to the tube 71. The pair of channels 77 are welded to the respective arms 79 and each has threadedly received in one leg 80 thereof a set screw 81. The two set screws 81 function to fix the clamping device 70 on the clamping mounting bar 76.

The tube 71 has an opening 85 in the side wall thereof. The base 78 of the yoke 72 threadedly receives a set screw 86 which has a pad 87 rotatably received on a reduced diameter portion 90 thereof. The pad 87 is retained on the screw 86 by an enlarged head 91. It will be noted that the tube 71 has a curving configuration which is generally vertical at 92 but which curves into a generally downwardly and rearwardly extending position at 93.

The hose 66 is preferably the most rugged hose available having a very stiff side wall. The function of the clamping device 70 is to clamp the hose 66 in position during operation of the apparatus. It can be seen that this is accomplished by tightening down the set screw 86 so that the pad 87 firmly engages the hose 66 and retains it in the illustrated position of FIGS. 2 and 3 in the tube 71.

Even though the hose 66 is rugged and strong, it has been found that when used in the present application wherein earth is continuously wearing against the hose the hose must be frequently replaced. The present clamping device 70 has proven to reduce very substantially the necessity of frequent replacement of the hose 66. When the hose 66 does become worn, all that is necessary is that the set screw 86 be released sufficiently to allow a further amount of the hose 66 to be payed out downwardly through the tube 71 whereupon the hose 66 is again fixed in position for further operation by tightening the screw 86. As can be seen from FIG. 1, a substantial portion of the hose 66, particularly when the hose is first installed, is left above the tube 71 so that when the hose does become worn at its distal end portion, further amounts of the hose can be payed out through the tube 71. The curving configuration of the tube 71 has also been found to appreciably reduce the wear on the hose inasmuch as the portion 93 of the tube curves gradually into the direction which the hose 66 is positioned as it is pulled. This has been found to appreciably reduce wear on the hose. Further the fact that the hose is gripped at a point between the two ends of the tube 92 appreciably reduces the wear at the gripping so that the hose 66 does not wear out at the point at which it is gripped by the pad 87.

Referring now to FIG. 5 and also to FIGS. 9 and 10, there is illustrated an alternative form 100 of the clamping device 70. The clamping device 100 is used in FIG. 5 with the above described plow while the clamping device 200 in FIGS. 9 and 10 is used with a chisel plow described below. Clamping device 100 is identical to clamping device 200 in that a wedge 101 is driven into the tube 102 in order to grip the hose 66. The configurations of the wedge 101 and the wedge 201 are identical as are the configurations of the tube 102 and the tube 202. As illustrated in FIGS. 9 and 10, the wedge 201 has a head 205 which can be driven by a hammer to seat the wedge in the tube 202 bearing against the hose 206 and the tube and locking the tube in place. As shown in FIG. 11 the wedge has a curved inner surface 207 which engages the hose 206. Because the hose is strong and tough identically to the hose 66, the wedge firmly retains the hose in place but does not damage it or cause wear to it.

Figure 4:
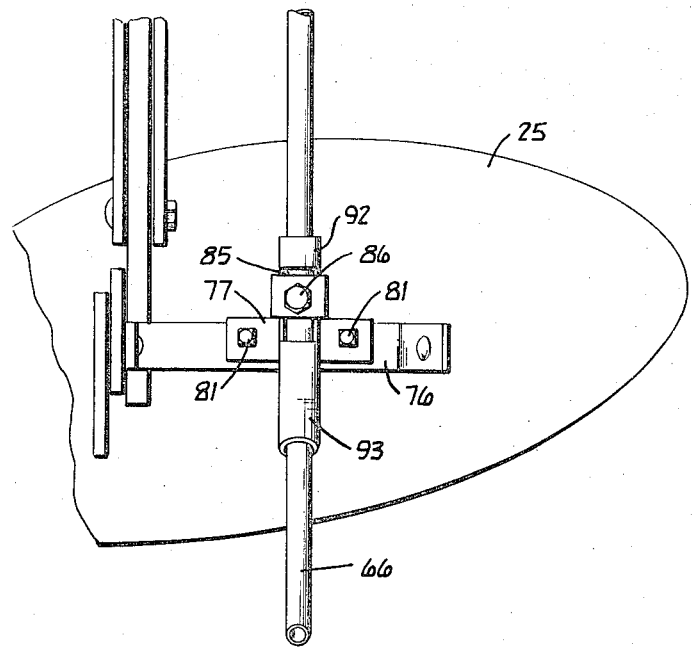
FIG. 4 is a fragmentary rear elevation of the structure illustrated in FIG. 2 and FIG. 3 showing the hose mount on the plowshare.

The clamping device of FIGS. 5, 9 and 10 has been found to appreciably reduce the wear on the hose like the clamping device of FIGS. 2-4 and has also been found to permit quick and easy adjustment of the hose when the distal end thereof wears off. This quick and easy adjustment is accomplished by striking the head 205 upwardly with a hammer to remove the wedge from the tube. The hose is then repositioned and the wedge again driven into position by striking the head 205 with the hammer. Unlike the tube 71, the tube 102 does not have a yoke 72 to secure it to the channel 105. Instead the tube 102 is welded to the single channel 105 which has a pair of set screws 106 fixing it to the clamp mounting bar or mold board brace 76. The tube 102 is continuous and has no openings therein except at its two ends. The tube 102 is curved in the same fashion as the tube 71 so as to project downwardly and rearwardly of the plow.

Referring now to FIGS. 7, 8, 9 and 10 there is illustrated embodiment of the invention which is a combined chisel plow and fertilizer dispenser. The chisel plow consists of a frame 210 on which is mounted a tractor hitch 211. The frame is supported by wheels 212 which are rotatably mounted on levers 215 fixed to a rock shaft 216. The rock shaft 216 is rotatable about its axis to raise or lower the frame 210 relative to the wheels 212. This rotation is accomplished by a hydraulic cylinder motor 217 which is pivoted at one end to the frame about the axis 220. The cylinder motor has a piston 221 which is pivoted to a lever 222 fixed to the rock shaft 216. The cylinder motor is controlled from the tractor so that the depth of plowing and attitude of the plow can be controlled during plowing.

Various types of plow blades 226, for example, points, spikes or sweeps, can be mounted on the shanks 225. The shanks are rigidly secured to the frame or, alternatively, may be spring mounted on the frame. The above described chisel plow structure is conventional and commercially available and can be found, for example, in a Brady chisel plow 1000 series. The use of a chisel plow as opposed to the plow of FIGS. 1-6 allegedly reduces soil erosion, saves moisture by causing it to be stored in the soil and saves time because it permits deeper plowing with a wider plow for a given tractor. During plowing the dirt is not picked up and thrown over into the next furrow as above described in connection with FIGS. 1-6 but instead is chiseled or split as the blades 226 are pulled (rightwardly as viewed in FIGS. 7 and 8) through the dirt. Referring to FIGS. 7-10 it can be seen that the blades 226 are fairly narrow in width and therefore a substantial portion of the soil is undisturbed as the blades pass therethrough except to be pushed sidewardly.

Figure 7:
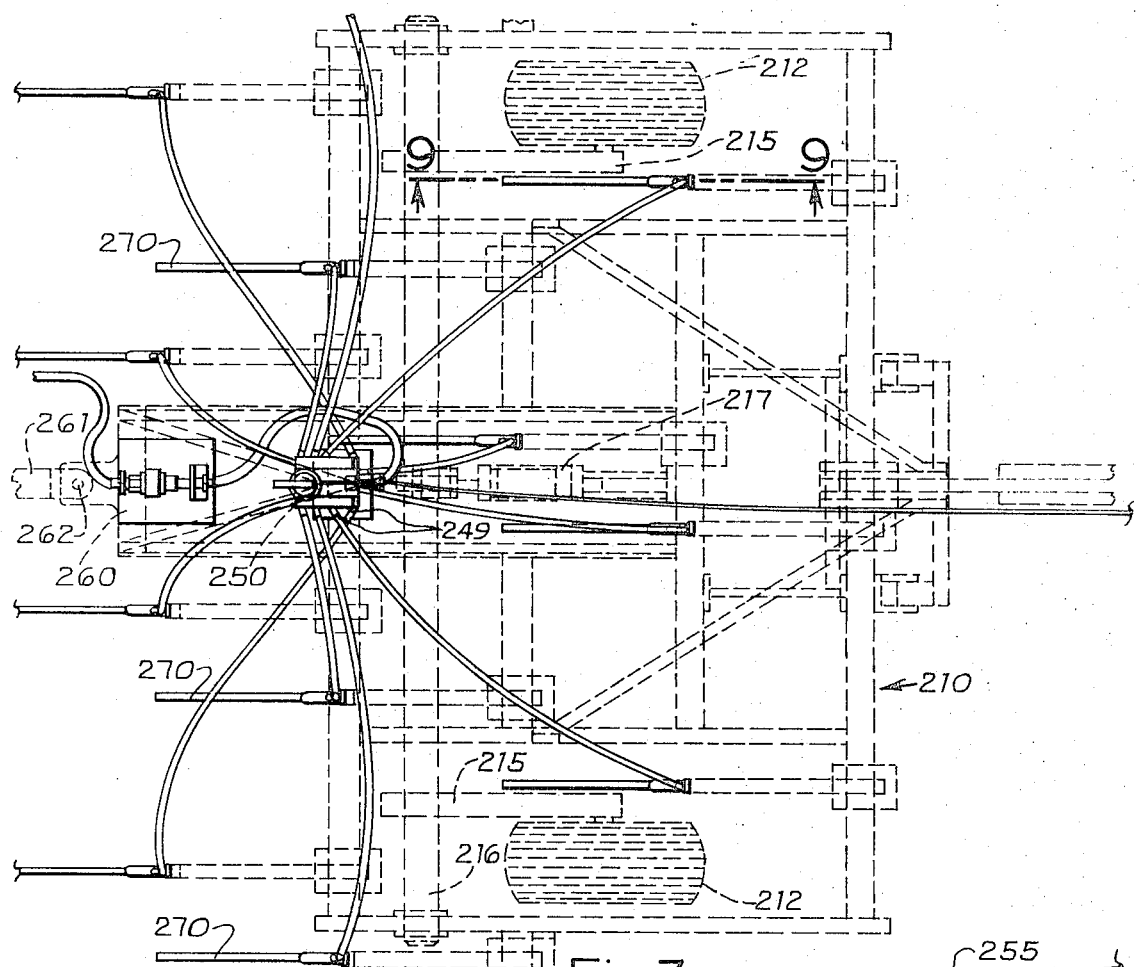
FIG. 7 is a top plan view of a combined chisel plow and fertilizer dispenser forming an alternative embodiment of the invention.
Figure 8:
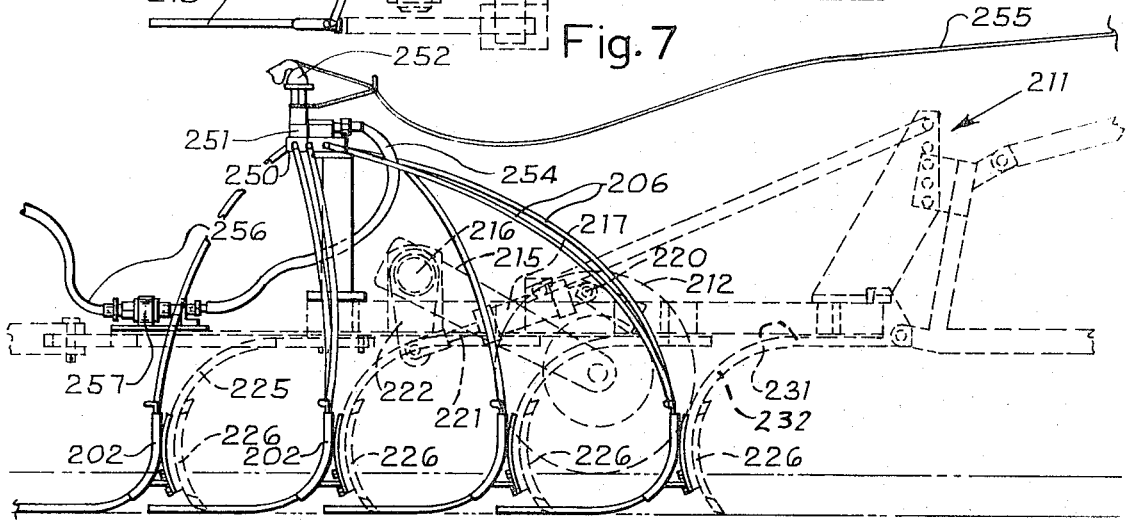
FIG. 8 is a side view of the structure illustrated in FIG. 7.

FIGS. 9, 10 and 11 show the details of mounting a representative one of the tubes 202 on the frame. The frame includes or provides a mount for the plurality of shanks 225 which have an upper horizontal portion 231 as well as a portion 232 which extends first downwardly and rearwardly then downwardly then downwardly and forwardly. A curved plate 235 has the tube 202 welded thereto at 236. A rod 237 is welded at its opposite ends 240 to the tube 202 and to the plate 235 so as to position the tube with its upper portion 241 vertical and its lower portion 242 in a downwardly and rearwardly extending position. Since the hose 206 is clamped in position by the wedge 201, the hose remains in position even though the dirt through which it is pulled tends to pull it through the tube 202. When the hose becomes worn, it can be easily trimmed off at its distal end and readjusted by removing and replacing the wedge 201. As shown in FIGS. 7 and 8, a plurality of hoses 206 lead from the output conduits 249 of the manifold 250 to and through tube 202. Preferably in the initial condition of the hoses 206 a greater amount of slack is provided in the hoses between the manifold 250 and the tube 202 than is shown in the drawing FIGS. 7 and 8.

In similar fashion to the above described embodiment, the apparatus of FIGS. 7 and 8 is provided with a nitrator 251 which may be, for example, a Model No. APR 6000 manufactured by Continental NH₃ Products Co., Inc. of Dallas, Texas 75222. The nitrator maintains a constant pressure of gas in the manifold 250. The apparatus of FIGS. 7 and 8 is also provided with an on-off valve 252 which is controlled by the line 255 to the tractor. The ammonia tank (not shown) has a hose 256 extending therefrom and communicating with a quick coupler 257 mounted on the structure 260. A further hose 254 extends between the manifold 250 and the quick coupler 257 which might be, for example, a "Pioneer" manufactured by Parker Hannefin Quick Coupling Division of Minneapolis.

The tank vehicle (not shown) of the present embodiment is pulled directly behind the plow by the structure 260 fixed to the frame. The draw bar 261 of the tank vehicle is pivoted to the structure 260 by a suitable pin 262.

Figure 12:
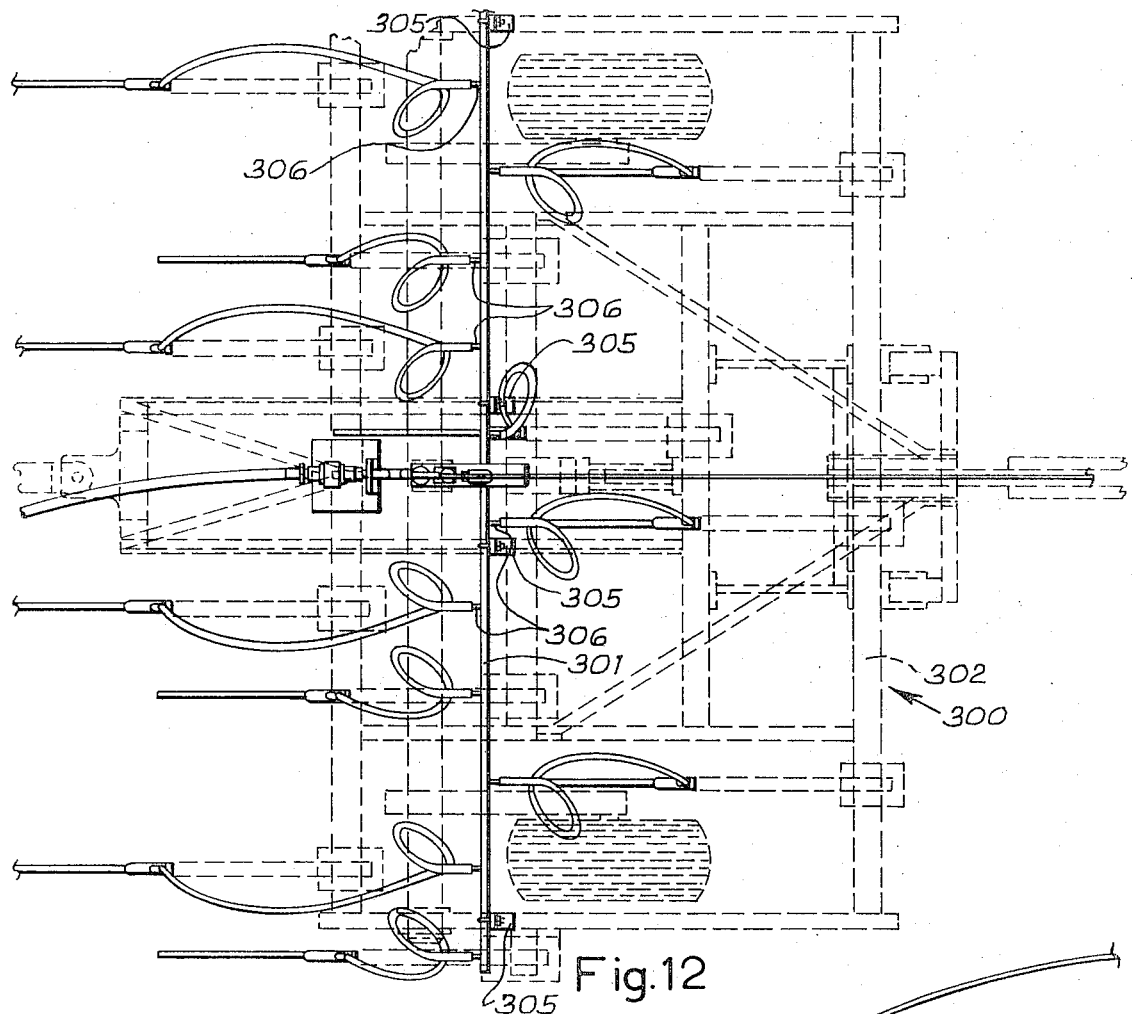
FIG. 12 is a top plan view similar to FIG. 7 of a combined chisel plow and fertilizer dispenser forming still another alternative embodiment of the invention.
Figure 13:
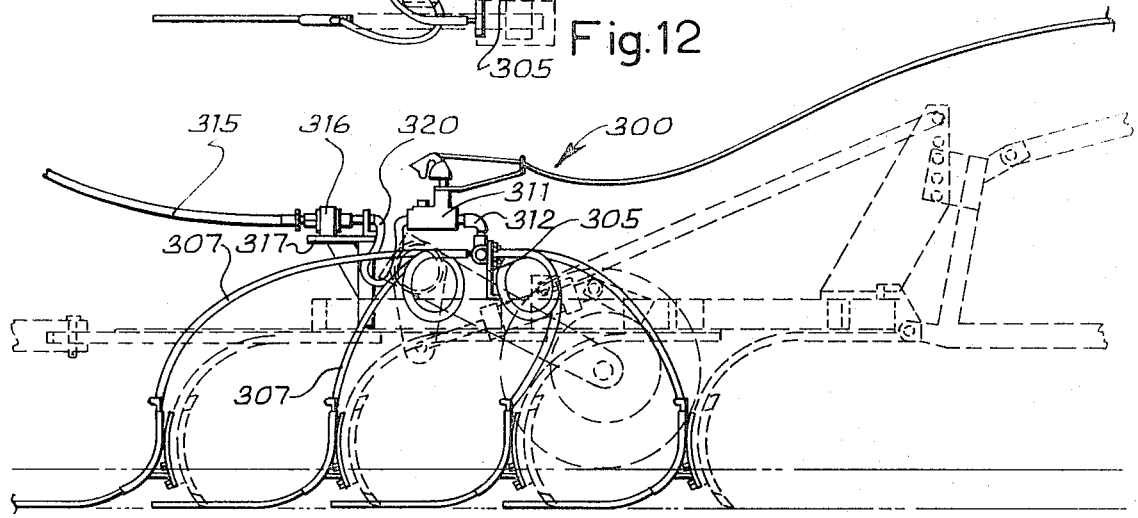
FIG. 13 is a side view of the structure illustrated in FIG. 7.

Referring now to FIGS. 12 and 13, there is illustrated an alternative embodiment of the invention which is generally identical to the embodiment illustrated in FIGS. 7 and 8 with the exceptions described below. In place of the manifold 251, the apparatus 300 of FIGS. 12 and 13 is provided with a long pipe manifold 301 which is fixed to the frame 302 by brackets 305. The manifold 301 has output conduits 306 to which are secured hoses 307. It can be seen that hoses 307 need not be as long as the hoses 206 because the distance from the output conduits 306 to the tubes 310 (which are identical to tubes 202) is less. Thus, the embodiment of FIGS. 12 and 13 saves on the amount of hose used. A nitrator 311 is coupled to the manifold 301 by rigid piping 312. Ammonia is supplied to the apparatus from the ammonia tank (not shown) through hose 315 secured to quick coupler 316 mounted on a platform 317 secured to the frame 302. A hose 320 connects the quick coupler 316 to the nitrator 311. In other respects, the embodiment of FIGS. 12 and 13 is identical to that of FIGS. 7 and 8.

In both the embodiment of FIGS. 7 and 8 and the embodiment of FIGS. 12 and 13, the dirt is pushed sidewardly or transversely of the plow by the chisel blades over at least some of the trailing distal ends of the hoses so as to retain the ammonia in the soil. Thus the rearmost blades 226, for example, push dirt over the next most rearward hose 206 distal ends 270. In some embodiments of the invention for certain types of soil the most rearward hoses are left off and not used because there are no chisel points or blades to cover the distal ends of those hoses. In such a situation, the manifold openings of the eliminated hoses are plugged.

It will be evident from the above description that the present invention provides an improved apparatus for placing anhydrous ammonia fertilizer into the soil. The present apparatus is particularly advantageous in that it makes unnecessary an extra trip across the farmer's land in order to place the fertilizer in the soil inasmuch as the farmer can fertilize the soil simultaneously with his plowing. Because the plow shares dig relatively deeply into the soil and because the soil is substantially agitated and overturned by the action of the mold board portion of the plowshares, the anhydrous ammonia has been found to become deeply and widely dispersed in the soil, and little is lost into the air. In the case of the chisel plow, the blades dig relatively deeply causing the ammonia to be deeply located in the soil and little to be lost in the air.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a combined plow and fluid fertilizer dispenser including a plow frame, plow blades mounted on said frame at spaced intervals arranged to open a plurality of furrows as said plow moves and to throw the dirt toward one side of said frame from said furrows over into adjacent furrows, said plow frame extending rearwardly and laterally away from the forward end portion of said plow frame to a rearward portion which is on the other side of said plow frame, the improvement which comprises: a tank vehicle of fluid fertilizer having a draw bar, a lateral element connected to said rearward portion of said frame and extending outboard of said plow frame and sidewardly away from said plow frame, a supporting wheel mounted at the distal end of said lateral element, a pull rod connected at one end to said forward end portion, means connecting said draw bar to said lateral element and connecting the other end of said pull rod to said lateral element, and hoses for each of the respective plow blades, means connecting said hoses and said tank for conducting fertilizer from said tank to said hoses, means mounting said hoses on said plow frame so as to extend downwardly beneath the discharge end of the respective plow blades whereby fertilizer is fed into said furrows beneath dirt thrown over into said furrows by said plow blades.

2. The structure of claim 1 wherein said hoses are adjustably mounted on said plow frame to permit, before further operation, gradual manual paying out of said hoses when they have become worn at their distal ends so that the hoses can always extend the same length into the furrows.

3. The structure of claim 2 wherein said means mounting said hoses comprises a plurality of clamping devices with each of said plurality of clamping devices gripping a respective one of said hoses; a plurality of clamp mounting bars mounted on said plow and fluid fertilizer dispenser forward of each of the discharge ends of each of the plow blades; said clamp mounting bars extending laterally of said plow frame; means mounting each of said clamping devices on a respective one of said clamp mounting bars, each of said clamping devices comprising: a tube having an opening in one side thereof and a respective one of said hoses extending therethrough, a yoke mounted on said tube, a first set screw extending through said yoke and tube opening and engaging said one hose.

4. The structure of claim 3 wherein said yoke has a U-shape with the arms of said U-shape straddling said tube, said means for mounting each of said clamping devices comprising channel means mounted on said yoke arms on the other side of said tube and a set screw threaded into said channel means, said channel means being received on a respective one of said mounting bars, said set screw engaging said respective mounting bar.

5. The plow and fluid fertilizer dispenser of claim 4 wherein said tube is curved from a downward to a rearward and downward direction, a pad rotatably mounted on the first set screw, said first set screw having an enlarged portion retaining said pad on said first set screw, said pad engaging said respective one hose.

6. Plowing and fertilizing apparatus comprising a frame, a plurality of plow blades mounted on said frame and spaced at intervals from one another and arranged to open a plurality of parallel furrows, each of said blades having a dirt discharge end, said plow blades being curved and positioned to throw dirt from said discharge ends laterally of said frame over into adjacent furrows, a tank vehicle connected to said frame in laterally spaced relation to said blades on the side of said frame away from the direction in which the dirt is thrown, a plurality of hoses, means mounting said hoses on said frame so as to extend downwardly beneath the discharge end of the respective plow blades whereby fertilizer is fed into said furrows beneath dirt thrown over into said furrows by said plow blades, and means connecting said tank vehicle and said hoses for conducting fertilizer from said tank vehicle to said hoses, said means for mounting said hoses comprising a plurality of curved tubes fixed to said plow frame and arranged at spaced intervals on said plow frame, said tubes having openings therethrough, clamping means mounted on said tubes and engageable with said hoses through said openings for clamping said hoses in said tubes, said tubes curving downwardly and then gradually rearwardly of said plow frame.

7. Plowing and fertilizing apparatus comprising a frame, a plurality of plow blades mounted on said frame and spaced at intervals from one another and arranged to open a plurality of parallel furrows, a plurality of hoses, means mounting each of said hoses on said plow frame in such a position that they each are positioned rearwardly of a respective one of said plow blades and hang freely in a rearwardly extending configuration, some of said plow blades being positioned rearwardly of said plow as compared to others of said plow blades, said some blades acting to move dirt into the furrows opened by said other blades said hoses extending rearwardly a sufficient distance that their distal ends are as rearward as said some blades whereby said some blades are moving dirt into said furrows over the distal ends of said hoses, and means for providing fertilizer to said hoses for exhausting from the distal ends thereof, a portion of said frame comprising a shank mounting one of said blades, said means for mounting said hoses comprising a curved tube, a wedge received in said tube and holding one of said hoses in place, a curved plate, said tube being mounted on said curved plate, bolts securing said plate to said shank, said tube curving downwardly and then gradually rearwardly of said plow frame.

* * * * *